United States Patent
Chen et al.

(10) Patent No.: US 8,185,781 B2
(45) Date of Patent: May 22, 2012

(54) INVARIANTS-BASED LEARNING METHOD AND SYSTEM FOR FAILURE DIAGNOSIS IN LARGE SCALE COMPUTING SYSTEMS

(75) Inventors: Haifeng Chen, Old Bridge, NJ (US); Guofei Jiang, Princeton, NJ (US); Kenji Yoshihira, Princeton Junction, NJ (US); Akhilesh Saxena, Morristown, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 12/754,572

(22) Filed: Apr. 5, 2010

(65) Prior Publication Data

US 2010/0262858 A1    Oct. 14, 2010

Related U.S. Application Data

(60) Provisional application No. 61/168,056, filed on Apr. 9, 2009.

(51) Int. Cl.
    *G06F 11/00* (2006.01)
(52) U.S. Cl. ............................................. 714/26; 714/45
(58) Field of Classification Search ...................... 714/26
    See application file for complete search history.

(56) References Cited

U.S. PATENT DOCUMENTS

| | | | |
|---|---|---|---|
| 5,822,513 A * | 10/1998 | Ofer et al. .................... 714/42 |
| 6,101,624 A * | 8/2000 | Cheng et al. .................. 714/736 |
| 6,314,532 B1 * | 11/2001 | Daudelin et al. ............ 714/38.14 |
| 6,367,029 B1 * | 4/2002 | Mayhead et al. ................ 714/2 |
| 6,470,388 B1 * | 10/2002 | Niemi et al. ................... 709/224 |
| 6,708,306 B2 * | 3/2004 | Bartenstein et al. .......... 714/741 |
| 6,973,396 B1 * | 12/2005 | Shah et al. ...................... 702/81 |
| 7,395,457 B2 * | 7/2008 | Jiang et al. ...................... 714/45 |
| 7,840,854 B2 * | 11/2010 | Zhou ............................ 714/47.1 |
| 2004/0128511 A1 * | 7/2004 | Sun et al. ...................... 713/176 |
| 2005/0267702 A1 * | 12/2005 | Shah et al. ...................... 702/81 |
| 2007/0265713 A1 * | 11/2007 | Veillette et al. ................. 700/30 |
| 2008/0133971 A1 * | 6/2008 | Zhou .............................. 714/32 |
| 2009/0070797 A1 * | 3/2009 | Ramaswamy et al. .......... 725/10 |
| 2009/0077540 A1 * | 3/2009 | Zhou et al. ..................... 717/126 |
| 2009/0292941 A1 * | 11/2009 | Ganai et al. ...................... 714/2 |
| 2009/0292954 A1 * | 11/2009 | Jiang et al. ...................... 714/47 |

* cited by examiner

*Primary Examiner* — Scott Baderman
*Assistant Examiner* — Kamini Patel
(74) *Attorney, Agent, or Firm* — Paul Schwarz; Joseph Kolodka

(57) ABSTRACT

A method system for diagnosing a detected failure in a computer system, compares a failure signature of the detected failure to an archived failure signature contained in a database to determine if the archived failure signature matches the failure signature of the detected failure. If the archived failure signature matches the failure signature of the detected failure, an archived solution is applied to the computer system that resolves the detected failure, the archived solution corresponding to a solution used to resolve a previously detected computer system failure corresponding to the archived failure signature in the database that matches the detected failure.

16 Claims, 8 Drawing Sheets

Offline Preprocessing :

Define $m$ signature templates $T_1, T_2, \ldots, T_m$;
    For each templates $T_i, i = 1, \cdots, m$
        For each signature $S_j$ in the database, $j = 1, \cdots, n$
            Compute the distance $d(T_i, S_j)$;
            Store the distance as another field of failure object $S_j$ in the database
        End;
    End;

Online Retrieval :

Given the query signature $Q$, and the confidence bound $e$
    For each template $T_i, i = 1, \cdots, m$
        Compute the distance $d(T_i, Q)$;
        Sort the stored distances $d(T_i, S_j), j = 1, \cdots, n$;
        Identify the signatures satisfying the equation (10);
        Form the identified failures in the set $U_i$;
    End;
    Compute the intersection of all $U_i s, U = U_1 \cap U_2 \cdots \cap U_m$,
    Identify the best signature by comparing the query with each signature in $U$.

INVARIANTS-BASED LEARNING METHOD AND SYSTEM FOR FAILURE DIAGNOSIS IN LARGE SCALE COMPUTING SYSTEMS

RELATED APPLICATIONS

This application claims the benefit of U.S. Provisional Application No. 61/168,056, filed Apr. 9, 2009, the entire disclosure of which is incorporated herein by reference.

FIELD

The present disclosure relates to failure diagnosis in computing systems. More particularly, the present disclosure relates to a method and system that uses historical experiences for diagnosing failures in large scale computing systems.

BACKGROUND

Failure diagnosis is the process of discovering the root cause of occurred failures based on a set of observed failure indications in the system. Fast and accurate diagnosis is essential to maintain the high availability of current computing systems.

The study of failure diagnosis in computing systems has gone on for quite a long time. Traditional approaches rely on profound understandings of the underlying system architecture and operational principles to build system models or a set of rules for the diagnosis. As the increasing complexities of current computing systems, however, it becomes hard to build a meaningful model or precise rules to facilitate the failure diagnosis. As an alternative, statistical learning based approaches received more attentions in recent years. Those methods identify the failure root cause by analyzing and mining a large amount of monitoring data collected from the failure system to characterize the failure behavior. However, those methods only output some prioritized failure symptoms such as the high CPU consumptions or disk usages. They do not provide further root causes of failures such as the broken hardware, configuration errors, and so on.

Accordingly, a need exists for a method and system that provides the root cause of failures occurring in large scale computing systems.

SUMMARY

A method is disclosed herein for diagnosing a detected failure in a computer system. The method comprises comparing a failure signature of the detected failure to an archived failure signature contained in a database to determine if the archived failure signature matches the failure signature of the detected failure. If the archived failure signature matches the failure signature of the detected failure, an archived solution is applied to the computer system that resolves the detected failure, the archived solution corresponding to a solution used to resolve a previously detected computer system failure corresponding to the archived failure signature in the database that matches the detected failure.

Further disclosed herein is a system for diagnosing a detected failure in a computer system. The system comprises a database containing an archived failure signature; and a processor associated with the database. The processor executes instructions for comparing a failure signature of the detected failure to the archived failure signature contained in the database to determine if the archived failure signature matches the failure signature of the detected failure. If the archived failure signature matches the failure signature of the detected failure, an archived solution is applied to the computer system that resolves the detected failure, the archived solution corresponding to a solution used to resolve a previously detected computer system failure corresponding to the archived failure signature in the database that matches the detected failure.

BRIEF DESCRIPTION OF THE DRAWINGS

FIG. 8 shows pseudo code of an embodiment of an algorithm for performing the failure retrieval process.

DETAILED DESCRIPTION

A method and system is disclosed herein for diagnosing failures in distributed transaction (large scale) computer systems. Failure diagnosis is the process of discovering the root cause of occurred failures based on a set of observed failure indications in the computer system. Fast and accurate diagnosis is essential to maintain the high availability of current computing systems. Because a large portion of failures in distributed transaction computer systems are repeated, the method and system of the present disclosure uses a learning approach for the failure diagnosis.

Figure 1:
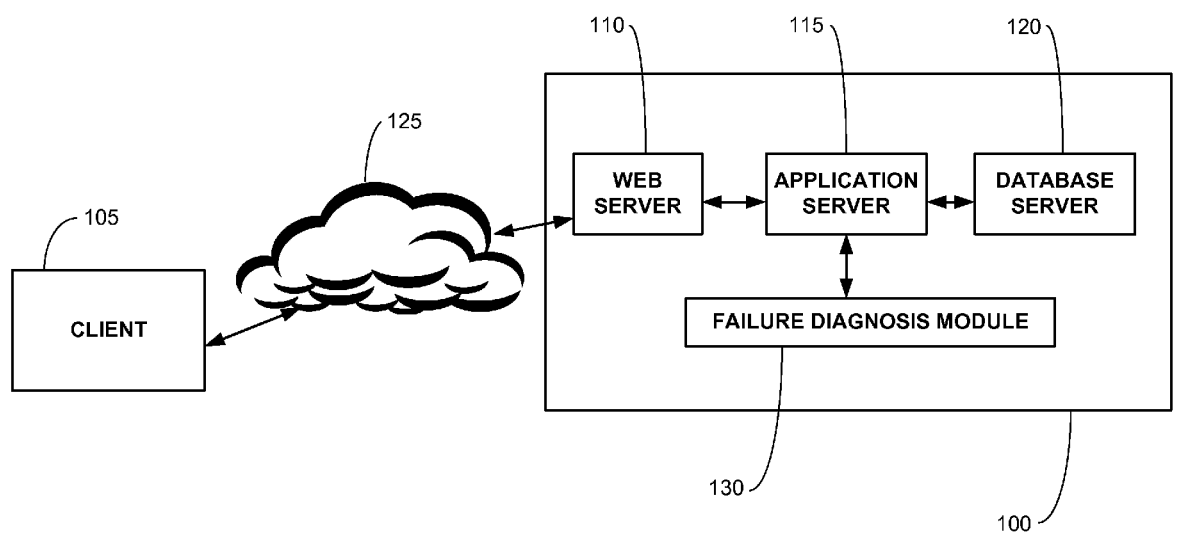
FIG. 1 is a block diagram of an exemplary embodiment of a distributed transaction computer system (distributed system).

Most distributed transaction computer systems, such as Internet services, employ multi-tier architectures to integrate their components. FIG. 1 shows an exemplary embodiment of a distributed transaction computer system 100 (distributed system). The distributed system includes a three-tier architecture that contains a web tier having one or more webservers 110, a middleware tier having one or more application servers 115, and a database tier having one or more database servers 120. One or more individual client computers 105 at a plurality of locations can communicate with the web servers 110 via a communication network 125, such as the Internet. The one or more web servers 110 communicate with other servers, such as the one or more application servers 115 and the one or more database servers 120.

The one or more web servers 110 operate as an interface, or gateway, to present data to the browser of the one or more client computers 105. The one more application servers 115 support specific business, or application logic for various applications, which generally includes the bulk of an application. The one or more database servers 120 are used for data storage.

The distributed system 100 further includes a failure diagnosis module 130 for performing an invariants-based learning process or method on the distributed system 100 to diagnose failures in the system 100. The failure diagnosis module 130 can be executed on one or more of the web, application, an database servers 110, 115, 120. Alternatively, the failure diagnosis module 130 can be executed on its own server or computer (not shown).

One of ordinary skill in the art will appreciate that the invariants-based learning process for failure diagnosis can be applied to distributed systems having other types of components and tiers.

The web, application, and database components 110, 115, and 120 of the distributed system shown in FIG. 1, can be built from a number of software packages running on servers (computers) which provide similar functionality. For example, such software packets can include, without limitation, Apache and IIS for the web servers 110, WebLogic and WebSphere for the applications server 115, and Oracle and DB2 for the database servers 120.

During operation, the distributed system 100 produces large amounts of monitoring data, such as log files, to track its operational status. In accordance with the method and system of the present disclosure, this data is measured from the various components of the distributed system 100, i.e., the web, application and data servers 110, 115 and 120, the client computers 105, the system networks, and from the application workloads. CPU usage, network traffic volume, and number of SQL queries are non-limiting examples of monitoring data that may be measured. Measurements of various resource utilizations can be obtained from the web, application and data servers 110, 115 and 120 and the client computers 105, such as CPU, memory, and disk utilizations. Measurements about network packets can be obtained from the networks of the distributed system. System workload measurements can be obtained as the number of user requests entering the distributed system. User requests traverse a set of the system components and software paths according to application logic. Much of the internal monitoring data of the distributed system reacts to the volume of user requests.

While a large volume of user requests flow through various components in the distributed system 100, many resource consumption related measurements respond to the intensity of user loads, accordingly. Therefore, flow intensity, as used herein, refers to the intensity with which internal measurements respond to the volume of (i.e., number of) user loads. Based on this definition of flow intensity, constant relationships between two flow intensities can be determined at various points across the distributed system 100 in accordance with the present disclosure. If a constant relationship between two flow intensity measurements always hold true under various workloads over time, this relationship is referred to herein as a pair-wise invariant or pair-wise invariant model of the distributed system 100.

The failure diagnosis module 130 extracts the status of system invariants and then uses them to reflect the failure behavior. Such representation not only captures suspicious system attributes but also their correlation changes during the failure. Furthermore, the temporal behavior of the failure is also included in the signature by combining a sequence of observations along the failure time. The invariants of the distributed system can be extracted by the failure diagnosis module 130 using the methods and systems described further on. Such methods and systems are also described in co-pending U.S. patent application. Ser. No. 11/860,610 filed Sep. 25, 2007, the entire disclosure of which is incorporated herein by reference.

When a failure occurs in the distributed system 100, a sequence of broken invariants is recorded by the failure diagnosis module 130 in a binary vector to represent the failure behavior. In one embodiment, spatial and temporal evidences about the failure are embedded into the signature. As a result, a more accurate representation of system failures can be achieved, especially when the failure observations are noisy. With such failure signature representation, a database is created to store all historical failures, as well as the historical failures' annotations. Failure diagnosis is performed by searching for similar failures in the database so that previous experiences about failure recovery can be reused. In one embodiment, a metric is disclosed herein for describing the similarity between two failure signatures. The metric compares failure signatures by considering the number of common broken invariants as well as the union of broken invariants in the signatures. This metric can lead to better differentiations between various failure types. Efficient search techniques are also disclosed herein to speed-up the signature retrieval from the database. In one embodiment, several predefined signature templates are used to index the historical failures to accelerate failure retrieval, by computing the distances between all historical failures and the templates offline. Given a query signature, distances from the query signature to the predefined signature templates are computed. Based on those distances, an inference is made about the location of the query signature in the database. As a result, many irrelevant failures in the database can be ruled out, and the actual search can be limited to a small number of potential candidates. With this method, an almost constant number of signature comparisons can be achieved even when the failure database increases.

Figure 2:
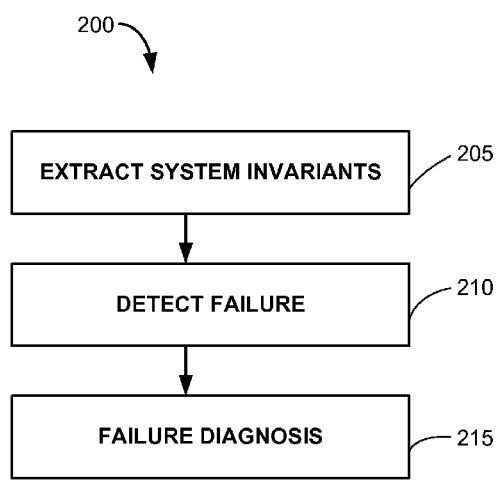
FIG. 2 is a high level flow chart of an embodiment of the invariants-based failure diagnosis learning method performed by the failure diagnosis module.

FIG. 2 is a high level flow chart of an embodiment of the invariants-based failure diagnosis learning method 200 performed by the failure diagnosis module. In block 205 of the method, system invariants are extracted during normal operation of the distributed system. When a failure is detected by the system in block 210, an invariants-based failure diagnosis is performed in block 215.

Figure 3:
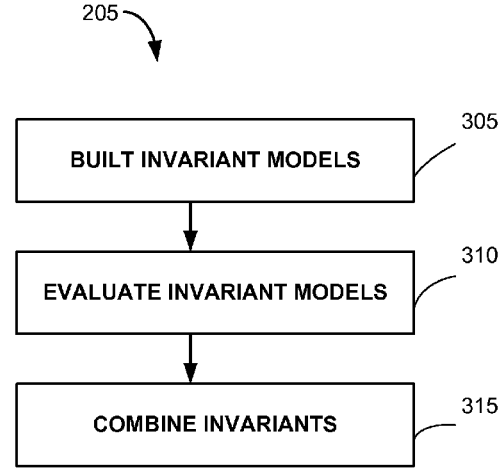
FIG. 3 is a flow chart illustrating an embodiment of the system invariant extraction process.
Figure 5A:
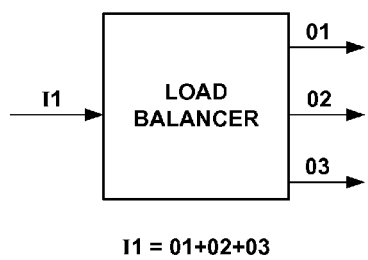
FIGS. 5A and 5B are examples of invariants in information systems.
Figure 5B:
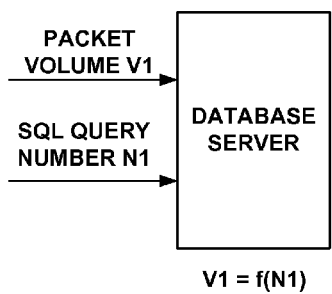

FIG. 3 is a flow chart illustrating an embodiment of the system invariant extraction process illustrated in block 205 of FIG. 2. The system invariants describe the large amount of monitoring data collected from the distributed system and are used because most of the distributed system attributes in the measurement data are strongly correlated. For example, the resource usage in the distributed system, such as CPU and memory usage, always increases or decreases in accordance with changing workloads in the system. Furthermore, the distributed system structure and design also introduce a lot of correlated attributes. As shown in FIG. 5A, assuming that a load balancer has one input $I_1$, and three outputs $O_1$, $O_2$ and $O_3$, there should always be $I_1 = O_1 + O_2 + O_3$ because this is the physical property of the load balancer. Meantime, in a web system, the volume of network packets $V_1$ going through the database, as shown in FIG. 5B, should always be correlated with the number of queries issued in the database because of the underlying logic of system components.

The system invariants are, therefore, extracted by building an ensemble of invariant models in block 305 to correlate the large amount of monitoring data collected from various points of the distributed system. If, in block 310, the discovered correlations can continually hold under different user scenarios and workloads, they are regarded as invariants of the distributed system. Each invariant contains a specific dependency relationship among the measurement attributes, which reveals some specific aspects of distributed system activities. All the discovered invariants are combined in block 315 to form a comprehensive view of the distributed system, which are used in the invariants-based failure diagnosis process.

The modeling of system invariants considers both spatial and temporal dependencies among system attributes. While the spatial relationship concerns the correlation across different attributes, the temporal dependency is related to the correlation in consecutive measurements of each attribute along time. In block 305, a brute force search method is used to build correlation models or invariant candidates between any pair of attributes x and y from the data z, y=f(x). Their measurements are treated as time series x(t) and y(t) and their relationship is learned by an AutoRegressive model with eXogenous inputs (ARX), $$y(t)+a_1 y(t-1)+\ldots+a_{n_1} y(t-n_1)=b_0 x(t)+\ldots+b_{n_2} x(t-n_2) \quad (1)$$

where $[n_1, n_2]$ is the order of the model that determines how many previous steps are affecting the current output. The coefficients $a_i$ and $b_j$ reflect how strongly a previous step is affecting the current output. If, $$\theta=[a_1, \ldots, a_{n_1}, b_0, \ldots, b_{n_2}]^T, \text{ and}$$

$$\phi(t)=[-y(t-1), \ldots, -y(t-n_1), x(t), \ldots, x(t-n_1), x(t), \ldots, x(t-n_a)]^T,$$

then Equation (1) can be rewritten as:

$$y(t)=\phi(t)^T \theta. \quad (2)$$

Assuming that the distributed system measurements have been observed over a time interval $1 \leq t \leq N$, $O_N=\{x(1), y(1), \ldots, x(N), y(N)\}$, the parameter $\theta$ can be obtained by the least squares solution $$\hat{\theta}_N = \left[\sum_{t=1}^{N} \varphi(t)\varphi(t)^T\right]^{-1} \sum_{t=1}^{N} \varphi(t)y(t). \quad (3)$$

A fitness score is used to evaluate how well the invariant model (1) fits the measurement data, based on what can be determined as the correct order [n, m] for the correlation model. Furthermore, the validation process of block 310 is used to test the robustness of learned models under various workload situations. Only those correlation models or invariant candidates that survived the validation are regarded as the invariants of the system. Since the learned invariants reflect the system internal properties and are robust under normal distributed system dynamics, such as the workload variations, they are combined in block 315 and used herein to facilitate failure diagnosis.

Figure 4:
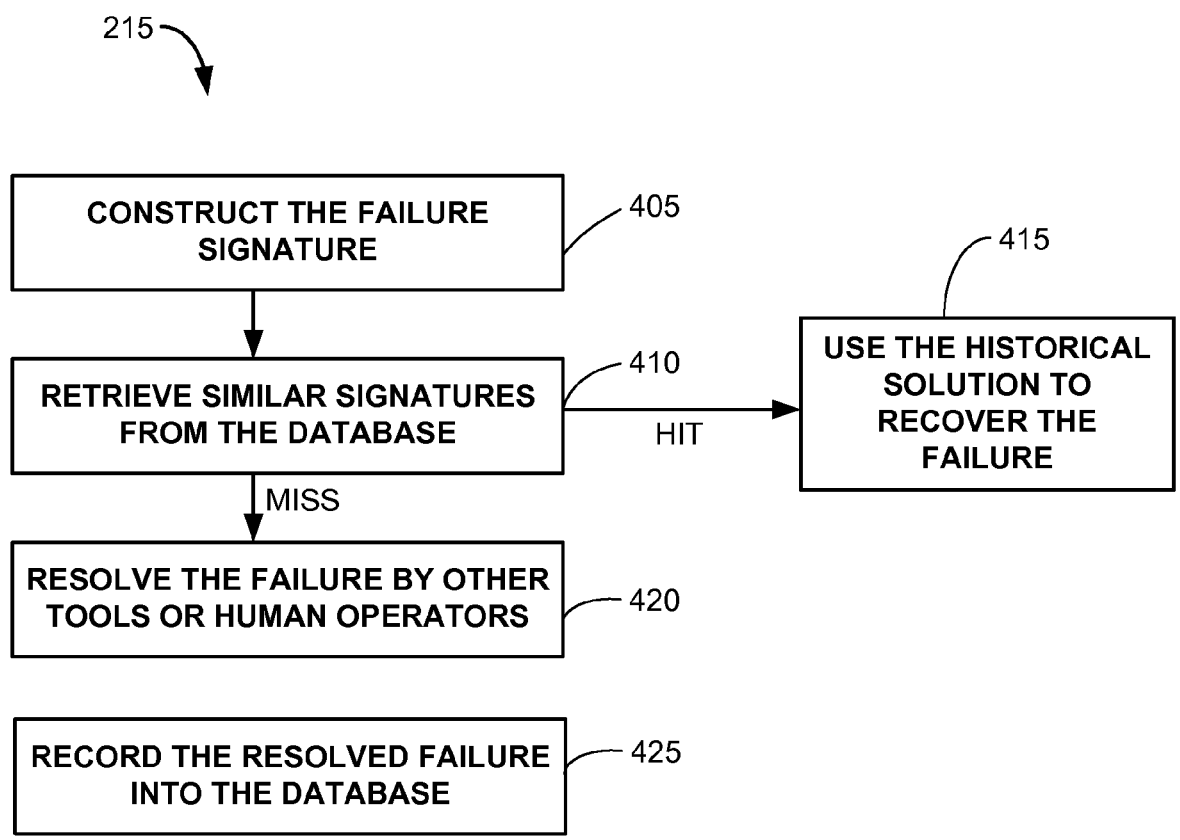
FIG. 4 is a flow chart illustrating an embodiment of the invariants-based failure diagnosis process.

FIG. 4 is a flow chart illustrating an embodiment of the invariants-based failure diagnosis process illustrated in block 215 of FIG. 2. Prior to performing the invariants-based failure diagnosis process, a failure signature database is built to store historical failure signatures and their corresponding solutions, as well as other related information such as the failure phenomenon descriptions, recovery mechanisms, and so on, as will be explained further on. Once the failure signature database has been built, the invariants-based failure diagnosis process can be commenced after a failure has been detected in the distributed system, with the construction of a failure signature in block 405. In block 410, similar historical failure signatures are retrieved from the failure signature database. If one of the similar historical failure signatures retrieved from the failure signature database matches the failure signature constructed in block 405, the historical solution used to resolve the failure corresponding to the similar historical failure signature, is used in block 415 to correct the currently detected failure in the distributed system. If none of the similar historical failure signatures retrieved from the failure signature database matches the failure signature constructed in block 405, then in block 420, the currently detected failure is resolved using other tools or by a human operator and the solution of block 420 and the corresponding failure signature constructed in block 405 are recorded in the failure signature database in block 425.

With respect to the other tools used for resolving failures, many system management software programs, such as IBM's Tivoli, HP's OpenView, and NEC's WebSAM, include tools for failure diagnosis. Such tools are based on some predefined rules or policies to pinpoint the failure cause. For example, one rule can be specified as: 'if CPU_user and CPU_system are low and Disk_swap is high, then the failure is related to the disk device.' Because it is difficult for system operators to define rules for all types of failures, human operators may still have to resolve the failure manually.

The failure signature constructed in block 405 can be performed by checking the condition of each of the invariants, to determine if the invariants are normal (unbroken) or broken. For example, the number of user requests in an e-commerce system has a certain relationship with the number of SQL queries in the database server(s). If the database server(s) encounters a failure, the relationship between the number of user requests and the number of SQL queries in the database server(s) will not hold anymore and therefore, the invariant is broken.

Figure 6:
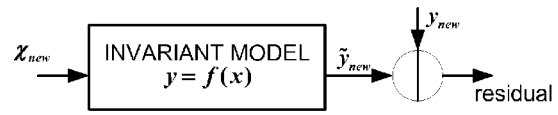
FIG. 6 illustrates an embodiment of a residual generation process that is performed for each new measurement based on an invariant model $y=f(x)$ in order to check whether that invariant model (invariant) is broken.

The distributed system runtime status can be inspected by examining the consistencies of learned invariants during the operation. FIG. 6 illustrates residual generation process which is performed for each new measurement based on an invariant model y=f(x) in order to check whether that invariant model (invariant) is broken. Given each incoming measurement during system operation, relevant attribute values $x_{new}$ and $y_{new}$, are selected and then $x_{new}$ is applied to the invariant model to generate the estimation $\hat{y}_{new}$. The difference between $\hat{y}_{new}$ and the real value $y_{new}$, is calculated as the residual $$R=y_{new}-\hat{y}_{new}. \quad (4)$$

A threshold is set for the residual R to determine whether the invariant model is broken. The threshold value is based on the residual values computed from historical data. In real situations, a system failure usually leaves evidences on a variety of invariant residuals instead of just a few broken invariants. The number of broken invariants is counted for each coming measurement to determine the failure status of the distributed system. If that number exceeds certain value, for example but not limitation, 10 percent of total invariants, the system is regarded as having encountered a failure. Consequently, an alarm can be generated indicating that a failure in the system has been detected, which failure can be diagnosed according to the present disclosure.

Figure 7A:
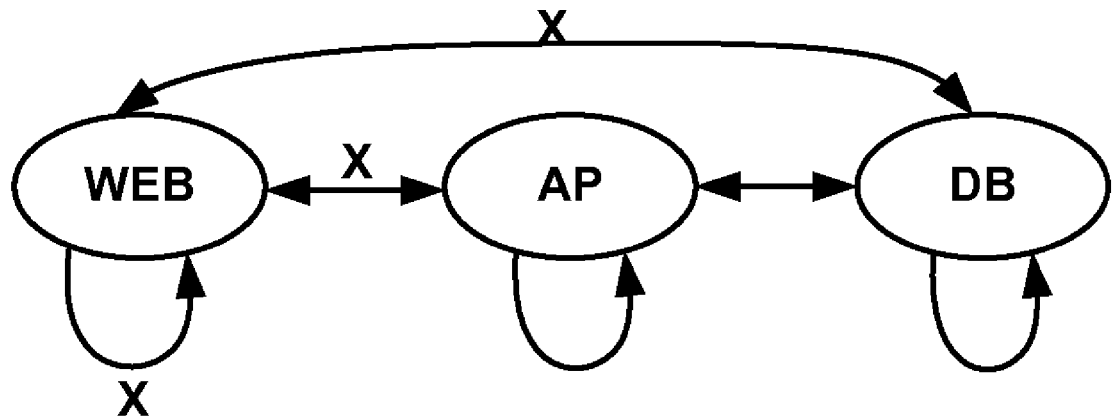
FIG. 7A illustrates the status of system invariants during a web server failure.
Figure 7B:
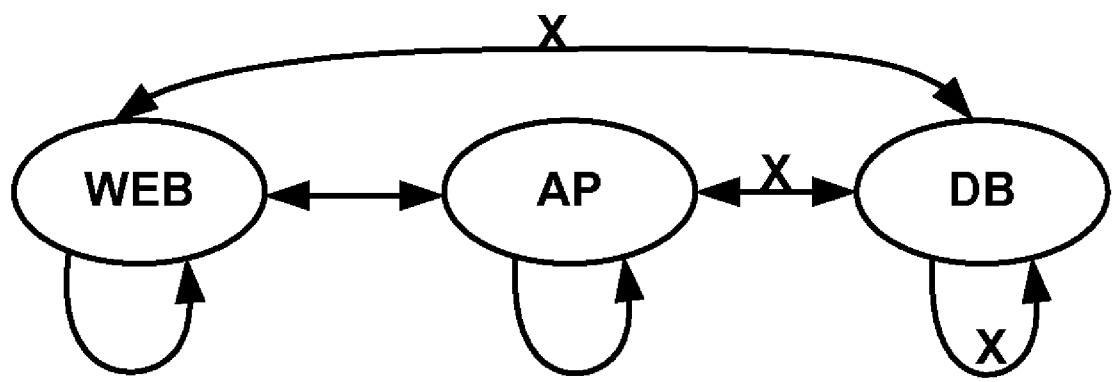
FIG. 7B illustrates the status of system invariants during a database server failure.

Then, the temporal and spatial evidences of the system invariants are combined to build the failure signature to diagnose the detected failure. While failure detection is based on the number of broken invariants in the system, failure diagnosis utilizes the status of system invariants to determine the failure root cause. The condition of each invariant, i.e., being normal or broken, provides a view of failure characteristics, because different types of failures usually introduce different sets of broken invariants. FIGS. 7A and 7B collectively present an example to illustrate different sets of broken invariants that have been combined with one another, in which the web, application (AP), and database (DB) servers, represent the components of the distributed system. Each line in FIGS. 7A and 7B, denotes a set of invariants formed by the attributes originating from two end components of the line. FIG. 7A presents a situation of web server failure. The reference character 'x' is used to mark the possible broken invariants, which include those inside the web server, those between the web server and the database server, and those between the web server and the application server. The invariants inside the application server and database server are usually not affected. However, when the database server encounters a problem, as shown in FIG. 7B, the broken invariants are distributed inside the database server, between the application server and the database server, and between the web server and the database server. Therefore, based on the locations of broken invariants it can be determined which part of the distributed system has a problem.

The invariants based representation provides more evidences about the failure source compared with simple measurements based failure representation, because the invariant based representation includes the correlation changes between system attributes during the failure. Such information is especially important when the failure symptoms are noisy. For example, when the numbers of abnormal attributes, i.e., those violating their thresholds, are the same in the web server and database server, it is hard for the measurements based representation to distinguish which server has to be more focused on during the diagnosis. However, in the invariants based representation, the sizes of the following two sets of broken invariants can be compared to get more clues: those between the web server and the application server, and those between the application server and the database server. If more invariants are broken between the web server and the application server, then the web server may be more suspicious for the failure source and needs more attention during the diagnosis, and vice versa.

Although FIGS. 7A and 7B illustrate a simple example to demonstrate the use of system invariants for failure diagnosis, there can be hundreds or even thousands of invariants distributed across various components of the distributed system. One of ordinary skill in the art will appreciate that the diagnosis is not limited to determining the problematic components of the distributed system, but can also determine the exact cause of the failure in the distributed system component. Accordingly, the status of the system invariants contains strong evidences about the failure cause, and therefore, the broken invariants are combined to build a sequence of binary vectors, which sequence defines failure signature. In one embodiment, the status of invariants is determined by building a binary vector, $V \in R^b$, to represent the invariants status. In the binary vector, the vector length L equals the total number of invariants in the system, the ith element in V indicates the status of the ith system invariant, with the value '1' denoting a broken invariant status and '0' indicating a normal unbroken invariant status, and the value of V can be used as a feature to describe the detected failure.

In a typical situation, the failure starts with a relatively small number of broken invariants, followed by a gradual increase of broken ones until they get saturated after some time. In order to include all those evidences during the failure period, the status of invariants at every sampling interval are recorded, represented as $v_1, \ldots v_K$, and the union of those observations are considered as the vector V, $V = v_1 \cup v_2 \cup v_K$. The length of the failure period, K, is determined based on the types of failures. If the failure is a transit failure or performance problem, the distributed system may go back to the normal state after a short time. Therefore, the time when the number of broken invariants falls below the threshold is detected, and this time is regarded as the end of failure period. For some long-lived failures, a maximum time window $\tilde{K}$ is set in which it is believed that all the failure behaviors can be included in that period. If there is no drop of broken invariants in $\tilde{K}$ time intervals, the union of recorded invariants is computed in that period as the vector V.

The failure signature database stores signatures of resolved historical failures, as well as other related information such as the failure phenomenon descriptions, recovery mechanisms, and so on. The failure signature database can significantly facilitate the failure recovery because past experiences can be reused to quickly determine the failure root cause and recovery solutions. One prerequisite for such knowledge reuse is to define a distance between various failure signatures, to identify the historical failure that shares the same characteristics with the detected one in order to retrieve similar signatures from the failure signature database in block 410.

Since the failure signature can be defined as a binary vector, the Hamming distance can be used in one embodiment as a distance metric for binary data. The Hamming distance is based on the number of bits that differ in two failure signatures. For example, the distance between two failure signature's, $S_e=[0\ 0\ 0\ 1]^T$ and $S_f=[0\ 0\ 0\ 1]^T$, is 1 because there is only 1 bit difference in two vectors. Note the Hamming distance treats the bit '0' and '1' equally in the signature comparison. That is, if the signatures $S_0$, and $S_1$ change into $S_0=[1\ 1\ 1\ 0]^T$ and $S_1=[1\ 1\ 1\ 1]^T$, their distance still remains the same. However, in the failure diagnosis process of the present disclosure, the comparison of broken invariants in two failure signatures is of interest because the broken invariants contain important features about the failure, which can be used to more effectively distinguish various failures. As in the previous example, the two failure signatures $\{[1\ 1\ 1\ 0]^T, [1\ 1\ 1\ 1]^T\}$ are expected to be closer to each other than the failure signature pair $\{[0\ 0\ 0\ 1]^T, [0\ 0\ 0\ 0]^T\}$ because the former pair has three broken invariants in common while the later does not share any broken invariants.

In another embodiment, the Tanimoto metric can be used to represent the distance between two signatures $S_0$ and $S_1$ $$d(S_0, S_1) = 1 - \frac{S_0 \cap S_1}{S_0 \cup S_1} \tag{5}$$

where signatures $S_0 \cap S_1$ denotes the number of '1's shared by two failure signatures, and $S_0 \oplus S_1$ expresses the number of '1's that appear in either failure signatures $S_0$ or $S_1$. In the Tanimoto distance, the bit '1' in the signature receives higher weight than the bit '0'. In terms of the previous example, we have $$d([0\ 0\ 0\ 1]^T, [0\ 0\ 0\ 0]^T) = 1 \tag{6}$$

which is larger than $$d([1\ 1\ 1\ 0]^T, [1\ 1\ 1\ 1]^T) = 0.25, \tag{7}$$

which is expected. Therefore, the Tanimoto distance can more accurately reflect the real underlying distances between failure signatures.

Similar failure signatures are retrieved from the failure signature database in block 410 using the distance metric defined in equation (5) by searching the failure signature database to discover the failure signature S that has the smallest distance with the query signature Q. To provide system operators more choices about the failure source inference, the retrieval method of block 410 generates a number of the most similar failure signatures, rather than just one. A bound $\epsilon$ is defined and a search is performed for failure signatures in the database that have distances to the query Q smaller than $\epsilon$ $$d(S,Q)<\epsilon. \quad (8)$$

The output of the retrieval is then an ordered list of historical failures whose failure signatures satisfy the constraint of equation (8) based on their distances to the query Q.

In one embodiment, failure signature retrieval process of block 410 can be performed by comparing the query Q with the failure signatures in the database, one by one. For a database containing n failure instances, n signature comparisons must be conducted in order to obtain the qualified outputs. Such a brute force search is time consuming when the number of signatures in the database becomes large.

The key to efficient failure signature retrieval is to design a data structure to store failure signatures so that the later retrieval process can be convenient. However, since the failure signature of the present disclosure is represented as an extremely high dimensional binary data, the commonly used data structures for nearest neighbor search, such as the KD tree, are not well suited for such a data set. In addition, similar signatures with respect to the query are desired rather than an exact match.

Figure 9:
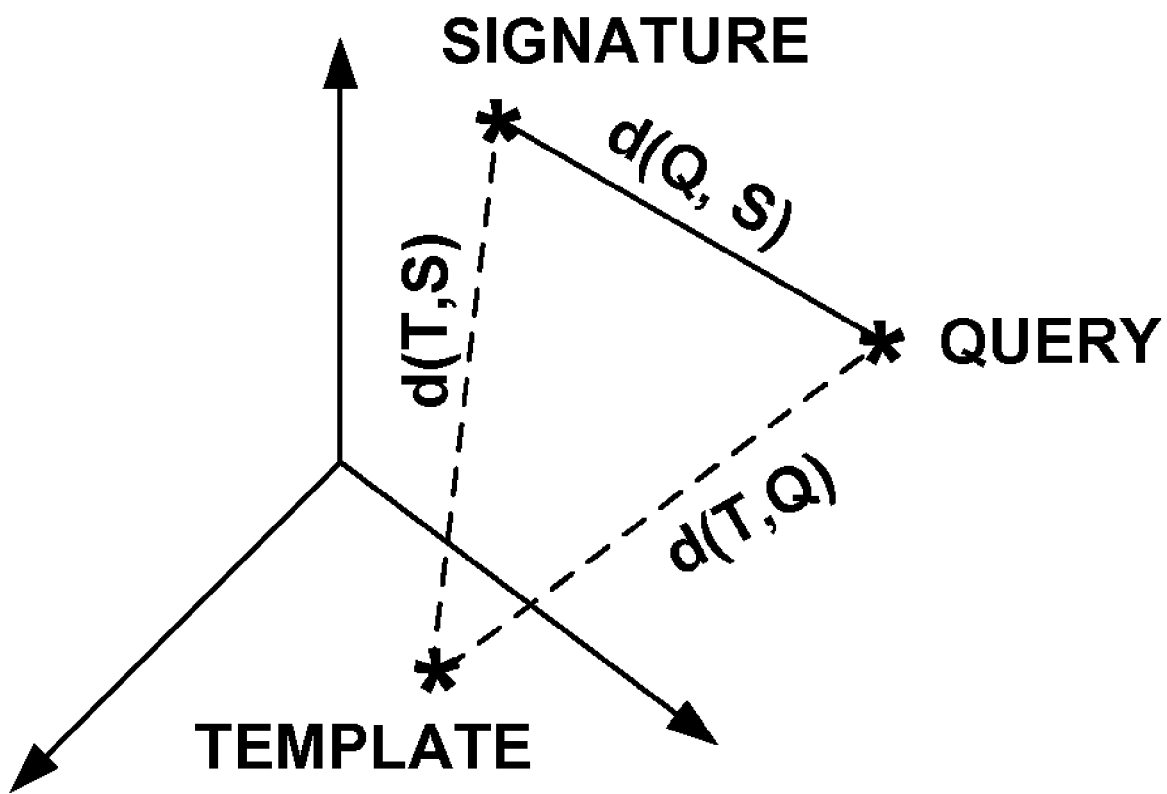
FIG. 9 illustrates an embodiment of a failure signature template and a query in the signature space.

FIG. 8 shows pseudo code of an algorithm 800 for performing the failure retrieval process of block 410. In the algorithm 800, failure signatures that obviously do not satisfy the constraint of equation (8) are filtered out so that the remaining failures are the focus of the comparison. The failure signature filtering is achieved by defining a signature template T as shown in FIG. 9, and applying a triangular property of the Tanimoto distance described above, from which there is obtained, $$d(T,Q)-d(S,Q)<d(T,S)<d(T,Q)<d(S,Q) \quad (9)$$

where Q represents the query signature, S represents the signature in the database, and T is the predefined signature template. If such an inequality is combined with the constraint of equation (8), the following equation can be easily obtained, $$d(T,Q)-\epsilon<d(T,S)<d(T,Q)+\epsilon \quad (10)$$

which means that those failure signatures S in the database that satisfy the constraint equation (8) must also obey the constraint equation (10). Note that the distance between the template and the failure signature in the failure signature database, d(T,S), can be computed offline because the template T is predefined and the signatures are already in the failure signature database. The failure signatures in the failure signature database can be sorted based on the distance d(T,S). When a query signature Q is received, instead of comparing Q with each failure signature Sj in the failure signature database, the distance between Q and the template T, d(T,Q) is calculated. In accordance with equation (10), the signatures having distance d(T, Sj) in the range [d(T,Q)−$\epsilon$,d(T,Q)+$\epsilon$] can be extracted as potential failure signature candidates. The failure signatures whose distances to the template are outside that range are regarded as irrelevant ones without further consideration.

The introduction of the signature template is performed to filter out irrelevant failure signatures in the failure signature database. The query still has to be compared with remaining failure signatures after filtering. In order to further reduce the number of failure signature comparisons, signature templates ($T_1, \ldots, T_m$) are constructed rather than only one. Failure signature filtering is used to obtain the potential candidates $U_i$s for each template $T_i$. The final candidates for the failure signature comparison are those in the intersection of remaining failure signatures from m templates, $U=U_1 \cap U_2 \ldots \cap U_m$.

In one embodiment of the failure retrieval method of block 410, m signature templates are randomly generated. In another embodiment, the m signature templates can be generated based on the distributions of signatures in the database so that the size of the final intersection set can be minimized. It should be noted that the failure signature comparison needs O(L) computations, where L is the number of system invariants, because the status of invariants have to be compared one by one in the two failure signatures. Such computation is not trivial when the system contains thousands of invariants or even more. In order to avoid as many signature comparisons as possible, the historical signatures are indexed based on their distances to the predefined templates. The distance based index can be used to efficiently filter out irrelevant failures in the database. In addition, the pre-computed distances can be utilized to sort historical failure signatures, which can further improve the search efficiency. As a result, the final signature comparison is only limited in a small set of signatures U.

In terms of the overall computation, O(log n) computations are spent on the filtering process, where n is the total number of failure signatures in the database, plus the cost of failure signature comparisons for the remaining candidates in U which is very small, and does not significantly increase with the database size. Compared with the brute force signature search which requires O(nL) computational cost, significant savings in the computations can be achieved, especially when the number of invariants L is large.

Figure 10:
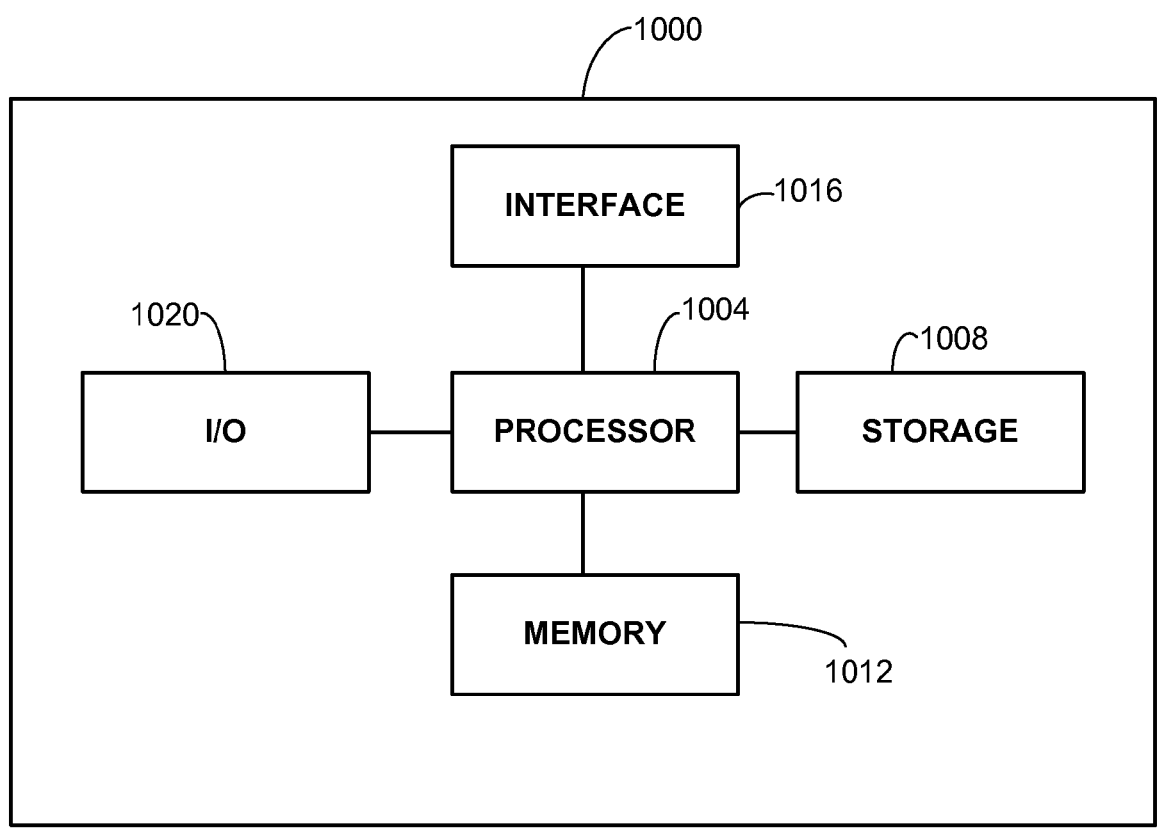
FIG. 10 is a block diagram of an embodiment of a computer that may be used for performing the method of the present disclosure.

The method of the present disclosure may be performed by an appropriately programmed computer, the configuration of which is well known in the art. An appropriate computer may be implemented, for example, using well known computer processors, memory units, storage devices, computer software, and other modules. A block diagram of a non-limiting embodiment of the computer is shown in FIG. 10 and denoted by reference numeral 1000. The computer 1000 includes, without limitation, a processor 1004 which controls the overall operation of computer 1000 by executing computer program instructions which define such operation. The computer program instructions can be stored in a storage device 1008 (e.g., magnetic disk) and loaded into memory 1012 when execution of the computer program instructions is desired. The computer 1000 further includes one or more interfaces 1016 for communicating with other devices (e.g., locally or via a network). The computer 1000 still further includes input/output 1020 which represents devices which allow for user interaction with the computer 1000 (e.g., display, keyboard, mouse, speakers, buttons, etc.). The computer 1000 may represent the failure diagnosis module and/or may execute the algorithms described above.

One skilled in the art will recognize that an implementation of an actual computer will contain other elements as well, and that FIG. 10 is a high level representation of some of the elements of such a computer for illustrative purposes. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software. Also, the processing steps may take place in a computer or may be part of a larger machine.

While exemplary drawings and specific embodiments have been described and illustrated herein, it is to be understood that that the scope of the present disclosure is not to be limited to the particular embodiments discussed. Thus, the embodiments shall be regarded as illustrative rather than restrictive, and it should be understood that variations may be made in those embodiments by persons skilled in the art without departing from the scope of the present invention as set forth in the claims that follow and their structural and functional equivalents.

What is claimed is:

1. A method for diagnosing a detected failure in a computer system, the method comprising:
    comparing, in a computer process, a failure signature of the detected failure to an archived failure signature contained in a database to determine if the archived failure signature matches the failure signature of the detected failure;
    if the archived failure signature matches the failure signature of the detected failure, applying, in a computer process, an archived solution to the computer system that resolves the detected failure, the archived solution corresponding to a solution used to resolve a previously detected computer system failure corresponding to the archived failure signature in the database that matches the detected failure;
    wherein the archived failure signature is based on a set of broken computer system invariants, the set of broken computer system invariants corresponding to the previously detected computer system failure;
    further comprising constructing the database in a computer process prior to comparing the failure signature of the detected failure to the archived failure signature;
    wherein the constructing the database includes extracting invariants from the computer system;
    wherein the extracting the invariants includes:
        modeling invariants of the computer system;
        evaluating each of the invariants to determine whether it is broken;
        counting the broken invariants to determine whether the number of the broken invariants meets a predetermined threshold number;
        if the number of the broken invariants meets the predetermined threshold number deeming this result the previously detected computer system failure; and
        combining the broken invariants into the set of broken invariants forming the archived failure signature of the previously detected computer system failure.

2. The method of claim 1, wherein if the archived failure signature does not match the failure signature of the detected failure, further comprising resolving the detected failure using an alternative solution implemented manually or in a computer process.

3. The method of claim 2, further comprising:
    storing the alternative solution in the database or another database as another archived solution; and
    storing the failure signature of the detected failure in the database as another archived failure signature.

4. The method of claim 3, wherein the another archived solution is indexed to the another archived failure signature.

5. The method of claim 1 wherein the archived solution is contained in the database or another database.

6. The method of claim 5, wherein the archived solution is indexed to the archived failure signature.

7. The method of claim 1, wherein the failure signature of the detected failure is determined by extracting invariants from the computer system prior to the comparing of the failure signature of the detected failure to the archived failure signature contained in a database.

8. The method of claim 7, wherein the extracting the invariants includes:
    modeling invariants of the computer system;
    evaluating each of the invariants to determine whether it is broken;
    counting the broken invariants to determine whether the number of the broken invariants meets a predetermined threshold number;
    if the number of the broken invariants meets the predetermined threshold number deeming this result the detected failure in the a computer system; and
    combining the broken invariants into a set of broken computer system invariants, the set of broken invariants forming the failure signature of the detected failure in the computer system.

9. A system for diagnosing a detected failure in a computer system, the system comprising:
    a database containing an archived failure signature; and
    a processor associated with the database, the processor executing instructions for:
        comparing a failure signature of the detected failure to the archived failure signature contained in the database to determine if the archived failure signature matches the failure signature of the detected failure;
        if the archived failure signature matches the failure signature of the detected failure, applying an archived solution to the computer system that
    resolves the detected failure, the archived solution corresponding to a solution used to resolve a previously detected computer system failure corresponding to the archived failure signature in the database that matches the detected failure;
    wherein the processor executes further instructions for extracting invariants from the computer system prior to the comparing of the failure signature of the detected failure to the archived failure signature contained in the database, in order to determine the failure signature of the detected failure
    wherein the extracting the invariants includes:
        modeling invariants of the computer system;
        evaluating each of the invariants to determine whether it is broken;
        counting the broken invariants to determine whether the number of the broken invariants meets a predetermined threshold number;
        if the number of the broken invariants meets the predetermined threshold number deeming this result the detected failure in the a computer system; and
        combining the broken invariants into a set of broken computer system invariants, the set of broken invariants forming the failure signature of the detected failure in the computer system.

10. The system of claim 9, wherein the archived failure signature is based on a set of broken computer system invariants, the set of broken computer system invariants corresponding to the previously detected computer system failure.

11. The system of claim 9, wherein if the archived failure signature does not match the failure signature of the detected failure, the processor executing further instructions for resolving the detected failure using an alternative solution implemented manually or in a computer process.

12. The system of claim 11, wherein the processor executes further instructions for:
    storing the alternative solution in the database or another database as another archived solution; and storing the failure signature of the detected failure in the database as another archived failure signature.

13. The system of claim 12, wherein the another archived solution is indexed to the another archived failure signature.

14. The system of claim 9, wherein the archived solution is contained in the database or another database.

15. The system of claim 14, wherein the archived solution is indexed to the archived failure signature.

16. A method for diagnosing a detected failure in a computer system, the method comprising:

comparing, in a computer process, a failure signature of the detected failure to an archived failure signature contained in a database to determine if the archived failure signature matches the failure signature of the detected failure;

if the archived failure signature matches the failure signature of the detected failure, applying, in a computer process, an archived solution to the computer system that resolves the detected failure, the archived solution corresponding to a solution used to resolve a previously detected computer system failure corresponding to the archived failure signature in the database that matches the detected failure;

wherein the failure signature of the detected failure is determined by extracting invariants from the computer system prior to the comparing of the failure signature of the detected failure to the archived failure signature contained in a database;

wherein the extracting the invariants includes:

modeling invariants of the computer system;

evaluating each of the invariants to determine whether it is broken;

counting the broken invariants to determine whether the number of the broken invariants meets a predetermined threshold number;

if the number of the broken invariants meets the predetermined threshold number deeming this result the detected failure in the a computer system; and combining the broken invariants into a set of broken computer system invariants, the set of broken invariants forming the failure signature of the detected failure in the computer system.

* * * * *